(12) United States Patent
Wilcox et al.

(10) Patent No.: US 7,470,875 B1
(45) Date of Patent: Dec. 30, 2008

(54) IGNITOR PLUG

(75) Inventors: Ernest W. Wilcox, Lake Park, FL (US); Nigel MacDonald, Plantation, FL (US); Robert A. Breslaure, Fort Lauderdale, FL (US)

(73) Assignee: Locust USA, Inc., Miami, FL (US)

( * ) Notice: Subject to any disclaimer, the term of this patent is extended or adjusted under 35 U.S.C. 154(b) by 202 days.

(21) Appl. No.: 11/305,712

(22) Filed: Dec. 16, 2005

(51) Int. Cl.
  F23Q 7/22 (2006.01)
  F23Q 7/00 (2006.01)
  F23Q 7/08 (2006.01)
  F02M 57/06 (2006.01)

(52) U.S. Cl. .................. 219/270; 219/260; 431/262; 313/120

(58) Field of Classification Search .......... 219/270, 219/260, 267, 538, 268, 269; 431/258–266; 313/118, 120, 132; 123/266
  See application file for complete search history.

(56) References Cited

U.S. PATENT DOCUMENTS

| | | | |
|---|---|---|---|
| 3,689,195 A | 9/1972 | Beesch et al. | |
| 3,996,915 A | 12/1976 | Demetrescu | |
| 4,088,105 A | 5/1978 | Bhat et al. | |
| 4,095,580 A | 6/1978 | Murray et al. | |
| 5,063,898 A | 11/1991 | Elliott | |
| 5,075,536 A * | 12/1991 | Towe et al. | 219/270 |
| 5,084,606 A * | 1/1992 | Bailey et al. | 219/270 |
| 5,085,804 A * | 2/1992 | Washburn | 252/516 |
| 5,245,959 A | 9/1993 | Ringenbach | |
| 5,497,744 A | 3/1996 | Nagaosa et al. | |
| 5,715,788 A | 2/1998 | Tarr et al. | |
| 6,289,869 B1 | 9/2001 | Elliott | |
| 6,439,191 B1* | 8/2002 | Elliott | 123/297 |
| 6,884,967 B1* | 4/2005 | Leigh | 219/270 |
| 6,900,412 B2 | 5/2005 | Taniguchi et al. | |
| 2002/0043524 A1* | 4/2002 | Taniguchi et al. | 219/270 |
| 2002/0130119 A1* | 9/2002 | Girlando et al. | 219/270 |
| 2005/0053884 A1* | 3/2005 | Schmiedlin et al. | 431/263 |

* cited by examiner

*Primary Examiner*—Daniel L Robinson
(74) *Attorney, Agent, or Firm*—Gordon & Jacobson, PC

(57) ABSTRACT

An improved glow plug for igniting fuel in a combustion chamber as well as a smart fuel supply system for glow plug applications.

23 Claims, 5 Drawing Sheets

IGNITOR PLUG

BACKGROUND OF THE INVENTION

1. Field of the Invention

This invention relates broadly to mechanisms for igniting fuel in a combustion chamber. More particularly, this invention relates to ignitor plugs that utilize resistive heating to ignite a liquid fuel supplied thereto for generating a flame that ignites fuel in a combustion chamber.

2. State of the Art

It is common for small size turbine engines and other small rotary engines to employ an ignitor plug that utilizes resistive heating to ignite a combustible gas fuel supplied thereto for generating a flame that ignites fuel in a combustion chamber. When the combustion chamber has been heated sufficiently, heavy liquid fuel is introduced and ignited by the hot flame in the combustion chamber. At that time the gas fuel to the ignitor plug is shut off and the engine continues to run on the heavy liquid fuel supplied to the combustion chamber. Such an ignitor plug is typically referred to as a glow plug. Examples of glow plugs are those sold commercially under the trade name O.S. Engines by Great Planes Model Distributors of Champaign, Ill. However, the resistive heating employed by the prior art glow plugs will not ignite heavy liquid fuels that are required to run the engine. This requires the incorporation of an additional gas fuel system to start the engine. The additional gas fuel system significantly increases the operational cost and weight of such engines.

Glow plugs which vaporize and ignite heavy fuel have been utilized in large diesel engines to heat the combustion air to aid in starting the engine. However, these prior art glow plugs typically use high amperage D.C. voltages and are very large and heavy. In addition, they are subject to coking of the fuel path through the glow plug. Such coking significantly reduces the operational lifetime of the glow plug and increases the operational costs of such engines. Moreover, these glow plugs are not compatible with small-size turbine engines.

Therefore, there remains a need in the art for an improved lightweight, low-amperage, low cost glow plug and starting systems based thereon that are suitable for small-size turbine engines and that are not susceptible to fuel coking.

SUMMARY OF THE INVENTION

It is therefore an object of the invention to provide an improved glow plug that is not as susceptible to coking of the fuel supply path through the glow plug as compared to prior art designs.

It is another object of the invention to provide such an improved glow plug that is lightweight and utilizes lower amperage D.C. voltage levels as compared to prior art designs.

It is yet another object of the invention to provide such an improved glow plug that is directly interchangeable with existing glow plugs for small-size turbine engines.

It is also an object of the invention to provide such as improved glow plug that provides high temperature heating for effectively vaporizing fuel flowing through the glow plug.

It is an additional object of the invention to provide a fuel supply system that is lightweight, low-amperage, low cost costing and thus suitable for small-size turbine engines.

It is another object of the invention to provide such a fuel supply system that dumps fuel that remains in (or enters) the internal fluid path of a glow plug during normal engine ON operations.

In accord with these objects, which will be discussed in detail below, a glow plug is provided with a casing that supports a conductive wire loop and a ceramic body. The ceramic body has a fuel path which is preferably in direct contact with liquid fuel passing therethrough. The conductive wire loop provides for resistive heating of the ceramic body in order to vaporize the liquid fuel flowing through the fuel path. An ignitor coil section ignites the vaporized fuel that exits from the fuel path of the ceramic body. Preferably, the ceramic body extends along a substantial portion of the lengthwise dimension of the conductive wire loop and also includes a passageway through which extends a portion of the conductive wire loop. Such an arrangement provides for enhanced thermal heating of the fuel within the glow plug with lower power consumption while minimizing the risk of electrical shorts between portions of the conductive wire loop.

According to one embodiment, the conductive wire loop has a resistance in a range between 4.9 and 5.1 ohms, provides for resistive heating to a temperature in the range of 1300 to 1400° F., and expends less than 30W of electrical power when activate. These parameters are sufficient to vaporize and ignite a wide range of heavy liquid combustible fuels (including jet fuel) with reduced power requirements. Moreover, liquid fuel is vaporized rapidly such that coking of the fuel path through the glow plug is significantly reduced.

Additional objects and advantages of the invention will become apparent to those skilled in the art upon reference to the detailed description taken in conjunction with the provided figures.

BRIEF DESCRIPTION OF THE DRAWINGS

FIG. 4 depicts the start-up mode operations carried out by the system; and FIG. 5 depicts the normal-ON mode operations carried out by the system.

DETAILED DESCRIPTION

Figure 1:
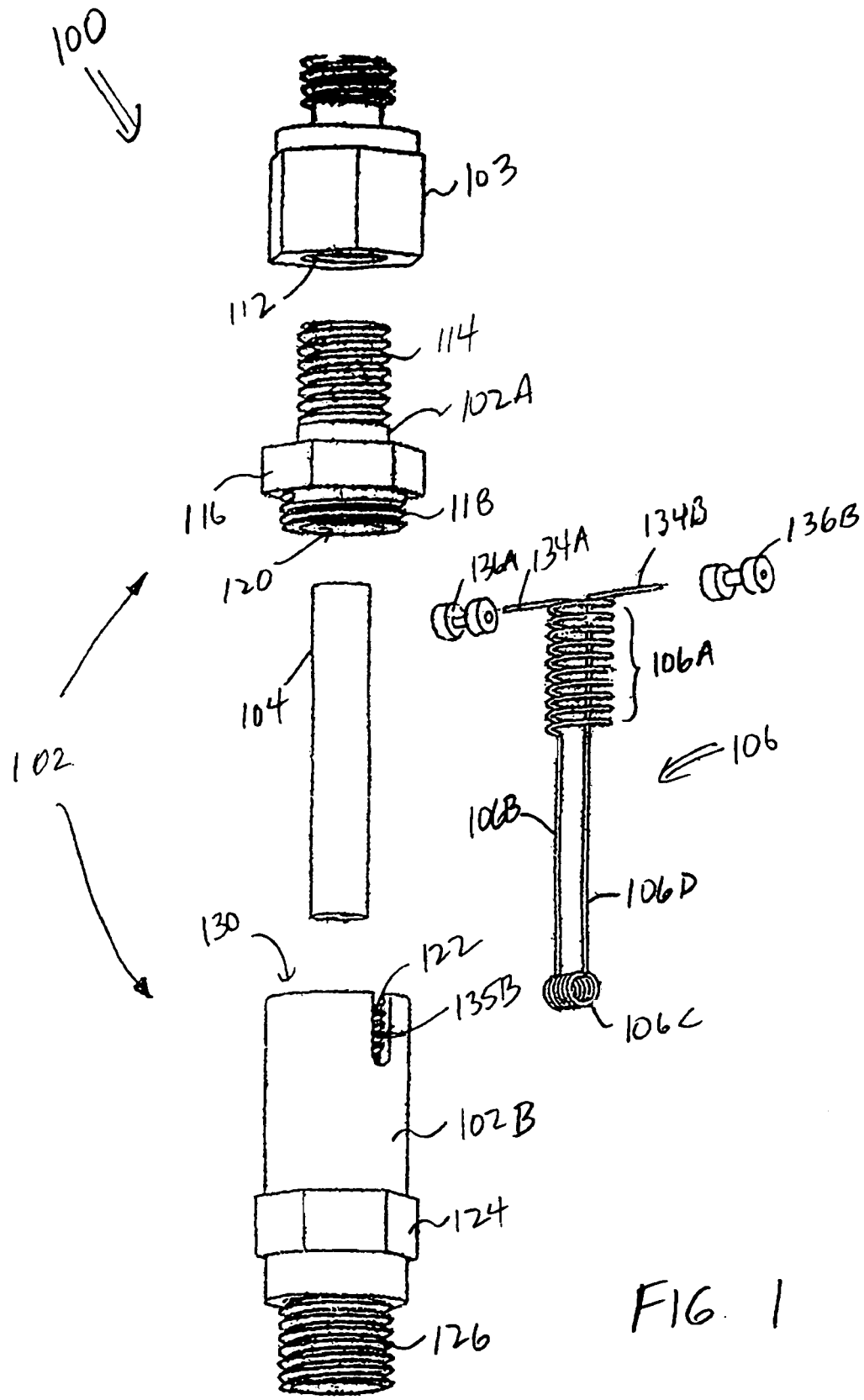
FIG. 1 is an exploded view of an ignitor plug in accordance with the present invention.
Figure 2:
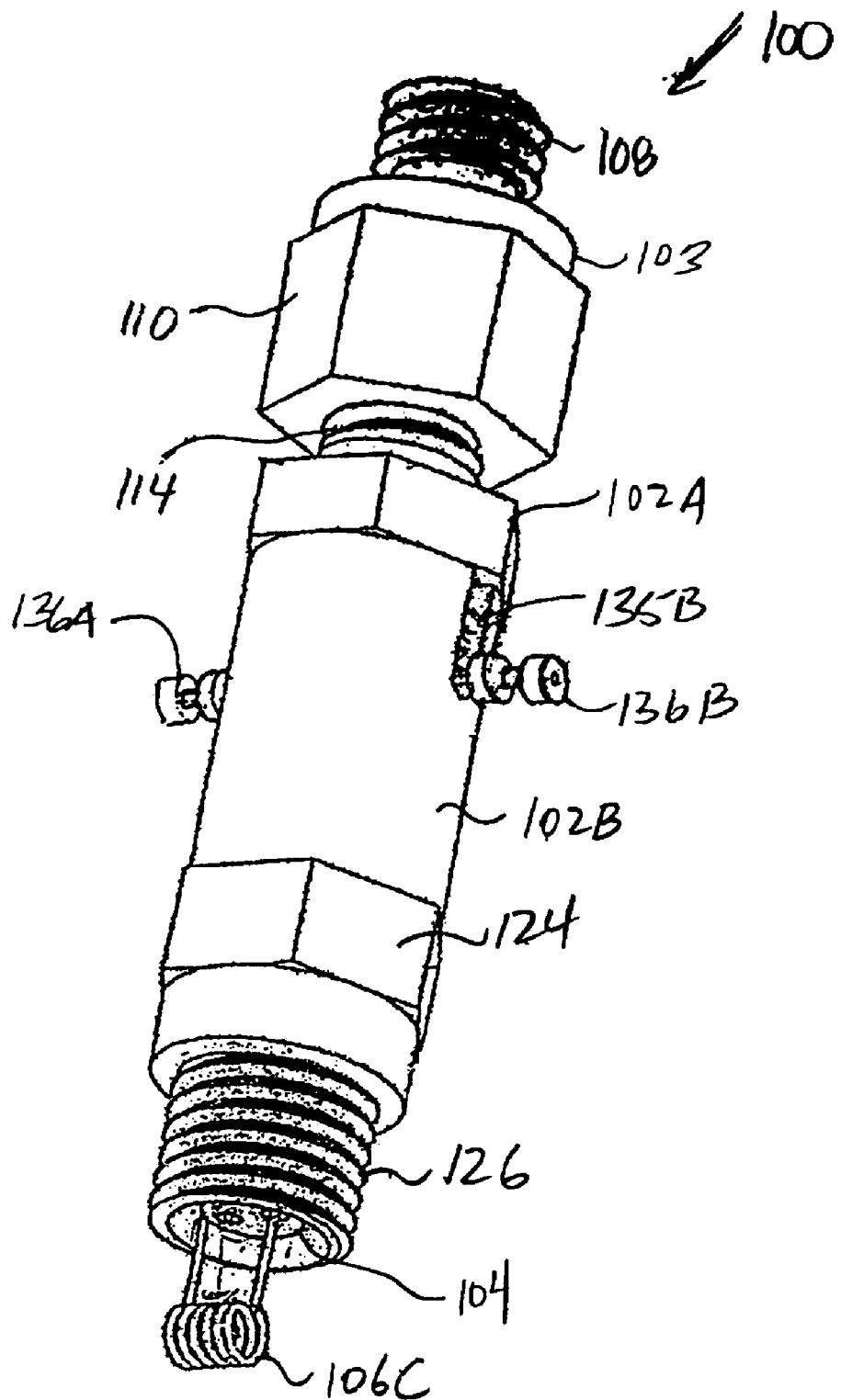
FIG. 2 is an assembled view of the ignitor plug of FIG. 1.
Figure 4:
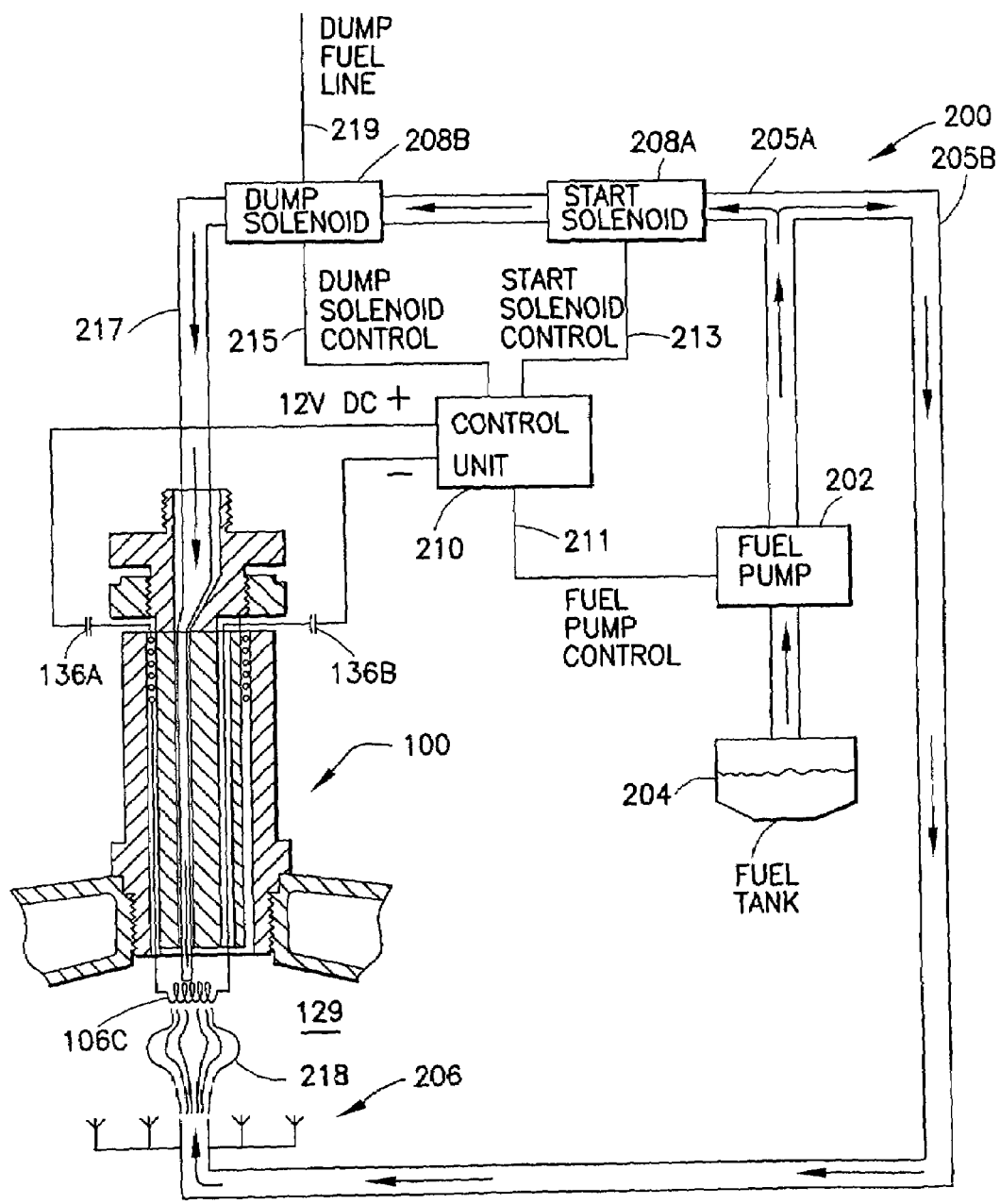
FIGS. 4 and 5 are schematic views of an automatic fuel supply system that employs the ignitor plug of FIGS. 1-3.
Figure 5:
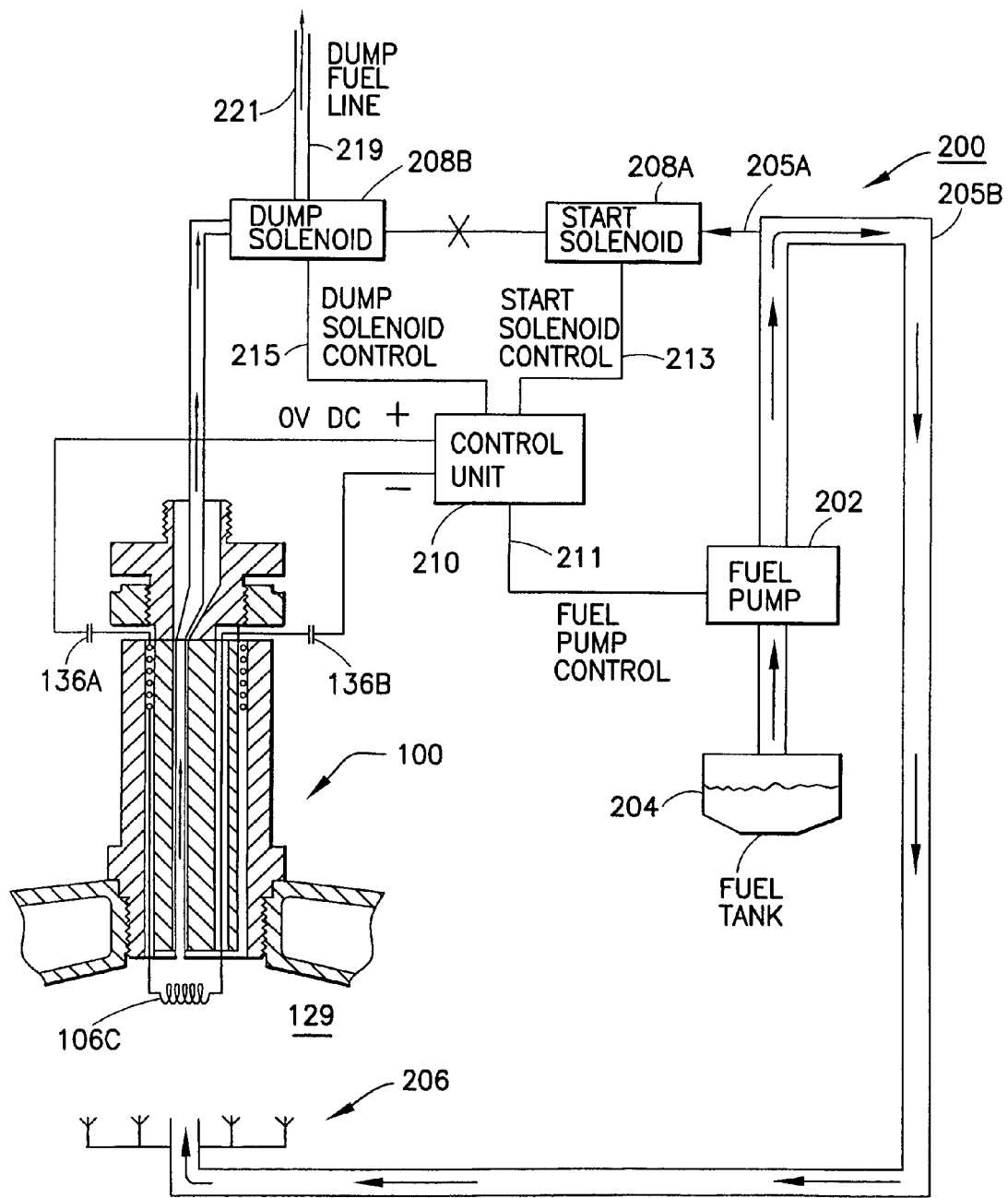

Turning now to FIGS. 1 and 2, an ignitor plug 100 in accordance with the present invention includes an outer casing 102 that mechanically supports a ceramic body 104 and a conductive wire loop 106 therein. In the preferred embodiment, the outer casing 102 includes an upper member 102A and a lower member 102B, which are preferably realized from a metal such as stainless steel, nickel or a nickel alloy. The upper member 102A is detachably coupled to a compression fitting 103 for coupling to a fuel supply line (FIGS. 4 and 5). The upper member 102A includes an upper exterior threaded male surface 114 that is detachably coupled to the interior threaded female surface 112 of the compression fitting 103, an exterior hexagonal-shaped drive surface 116, a lower exterior threaded male surface 118 that is coupled to the lower member 102B, and an annular chamber 120 that is surrounded at least in part by the lower exterior threaded male surface 118 and that receives the upper end of the ceramic body 104. The lower member 102B includes an interior threaded female surface 122 that is detachably coupled to the lower exterior threaded male surface 118 of the upper member 102A, an exterior hexagonal-shaped drive surface 124, a lower exterior threaded male surface 126 that is received by a threaded port 128 that leads to a combustion chamber 129 (FIG. 3), and an annular chamber 130 that is surrounded at least in part by the interior threaded female surface 122 that receives the lower end of the ceramic body 104. The lower member 102B also includes an inner sleeve 131 (FIG. 3) that is realized from a thermally-insulating potting compound such as the 906 magnesia adhesive compound sold commercially by Cotronics Corp. of Brooklyn, N.Y., Pair of slots 135A, 135B (FIG. 1) extend from the external space through the external casing and inner sleeve 131 into the annular chamber 130 and allow for passage of the two terminals 134A, 134B of the conductive wire loop 106 therethrough. Two connectors 136A, 136B are affixed to the corresponding terminals 134A, 134B to provide for quick and easy electrical coupling to a DC power source as described below. In this manner, the ceramic body 104 and the conductive wire loop 106 are operably disposed within an interior annular space defined by the annular chambers 120, 130 of the upper member 102A and lower member 102B, respectively.

Figure 3:
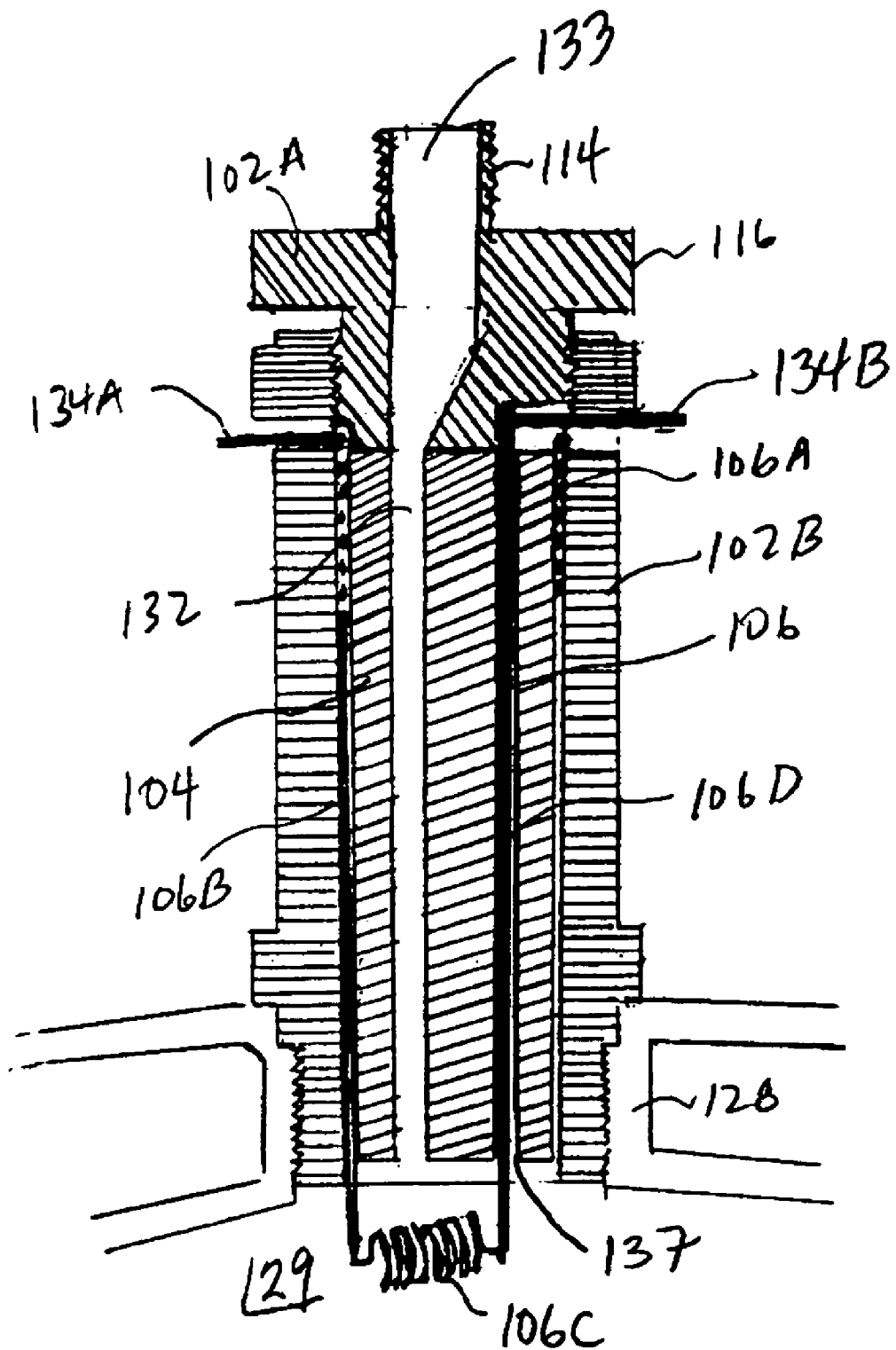
FIG. 3 is a partial cross-section of the assembled ignitor plug of FIG. 2.

As shown in FIG. 3, the ceramic body 104 is realized from a solid tube of thermally-conductive ceramic material with two internal passageways 132, 137 that extend along its lengthwise dimension. Suitable ceramic tubes with two internal passageways (such as the TRM-0418 model which has an outside diameter of ⅛ inch and two passageways each having a 0.04 inch diameter) are sold commercially under the OMEGATITE® name by OMEGA Engineering, Inc. of Stamford, Conn. The internal passageway 132 carries fuel such that the ceramic body 104 is in direct contact with the fuel passing therethrough. Such direct contact means that there are no intervening elements between the ceramic body and the fluid passing through the internal passageway 132. The internal passageway 137 provides a thru-path for a section of the conductive wire loop 106. The upper member 102A defines an internal fluid passageway 133 for fuel to pass therethrough between the fuel supply line (FIGS. 4 and 5) and the upper end of the internal fluid passageway 132 of the ceramic body 104. During start-up operations as described below, the fuel flows through the fluid passageway 133 to the upper end of the internal fluid passageway 132 and continues to flow to its lower end where it is ejected therefrom.

The ceramic body 104 extends along a substantial portion of the lengthwise dimension of the conductive wire loop 106. The upper end of the conductive wire loop 106 has two terminals 134A, 134B that extend through the slots 135A, 135B of the lower casing member 102B. The two terminals 134A, 134B are affixed to corresponding connectors 136A, 136B that are operably coupled to the positive and negative terminals of a DC power source. The conductive wire loop 106 can be logically partitioned into four sections 106A, 106B, 106C, 106D. The first section 106A is wound in a helical coil shape which is operably disposed about a portion of the external surface of the ceramic body 104 in a gap between the ceramic body 104 and the lower casing member 102B. The second section 106B is a straight section that extends along the external surface of the ceramic body 104 in this gap and beyond the lower end of the ceramic body 104. The third section 106C is wound in a helical coil shape to realize an igniter coil that is operably disposed downstream from the lower end of the internal fluid passageway 132 of the ceramic body 104. The fourth section 106D is a straight section that extends within the internal passageway 137 of the ceramic body 104. In this configuration, the fourth section 106D extends up through the coiled first section 106A (while being electrically isolated therefrom) and then joins the terminal 134B. Advantageously, the configuration minimizes the risk of electrical shorts between portions of the conductive wire loop 106.

During start-up operations, a DC voltage source (e.g., 12V DC) is applied across the two terminals 134A, 134B of the conductive wire loop 106, which causes a DC current to flow through the conductive wire loop 106. The DC current heats the conductive wire loop 106 to a temperature preferably greater than 1300° F., and most preferably in a temperature range between 1300 and 1400° F. The amount of current flowing through the conductive wire loop 106 is governed by the electrical resistance afforded by the conductive wire loop 106 in accordance with Ohm's Law. The length of the conductive wire loop 106 is selected to carefully control the electrical resistance realized by the conductive wire loop in order to provide the desired heating characteristics. In the preferred embodiment, the conductive wire loop 106 is realized by 0.010" diameter nichrome wire of approximately 0.9 inches in length that provides a total resistance of 4.9-5.1 ohms in the desired operating temperature. When used in combination with the 12V DC power supply, the resistance heating and ignition provided by the conductive wire loop expends between 28 to 30 watts of power, which is significantly less than the prior art designs. This reduced power requirement allows for the use of lightweight power supplies and thus reduces the overall weight of the system. Other metal wires suitable for high temperature resistive heating can also be used, including platinum and tungsten. The heat generated by the conductive wire loop is directly proportional to the resistance of the wire. This heat must be balanced carefully to insure that the igniter coil 106C remains at least 1300° F. and is not quenched by the fuel vapor exiting the internal fluid passageway 132 of the ceramic body 104.

The heat generated by the resistive heating of the conductive wire loop 106 is transferred to the ceramic body 104, which acts as a thermal conduit to apply heat to fuel flowing through the internal passageway 132 of the ceramic body 104. In the preferred embodiment, heavy liquid fuel (such as liquid jet fuel, kerosene or diesel) is supplied to the ignitor plug 100 and the heat applied to the liquid fuel by the wire loop 106 and ceramic body 104 is sufficient such that the heavy liquid fuel supplied thereto is substantially vaporized within the internal passageway 132 and thus is ejected from the internal passageway 132 in a vapor form. The heating temperature of the internal fluid passageway 132 must remain high enough to heat the heavy liquid fuel into vapor and minimize the amount of fuel remaining on the wall of the passageway to coke. The number of turns of the coiled section 106A of the wire loop and the thermal conductivity of the ceramic body 102 dictates the heating temperature of the internal fluid passageway 132.

The DC current flowing through the conductive wire loop 106 also causes the igniter coil section 106C to heat to a high temperature preferably greater than 1300° F., and most preferably in a temperature range between 1300 and 1400° F., which acts to ignite the vaporized fuel that is ejected from the internal passageway 132 and mixed with air. The flame from the burning vaporized fuel ignited by the coil section 106C ignites liquid fuel that flows into the combustion chamber 129 (FIG. 4).

Advantageously, the high heating temperature generated by the conductive wire loop 106 and ceramic body 104 significantly reduces the susceptibility of fuel coking the fuel supply path therethrough, and thus improves the operational lifetime of the ignitor plug 100. Preferably, the outer casing 102 of the ignitor plug 100 is sized and shaped such that ignitor plug 100 is directly interchangeable with existing glow plugs for small-size turbine engines.

The ignitor plug 100 as described herein is preferably employed as part of a smart fuel supply system 200 as shown in FIGS. 4 and 5. The smart fuel supply system 200 includes a fluid pump 202 that is fluidly coupled to a fuel tank 204 that stores heavy liquid fuel such as jet fuel, kerosene or diesel. The output of the fuel pump branches along two fluid supply paths 205A, 205B. The first fluid supply path 205A leads to the ignitor plug 100. The second fluid supply path 205B leads to a plurality of nozzles 206 for injecting liquid fuel into the combustion chamber 129. Two electronically-activated solenoids 208A, 208B are arranged in series along the first fluid supply path 205A. An electronic control unit 210 interfaces to the fuel pump 202 and the solenoids 208A, 208B.

During combustion start-up operations as shown in FIG. 4, the electronic control circuit 210 activates the fuel pump 202 via control line(s) 211 while opening both the solenoid 208A (labeled "start solenoid") and the solenoid 208B (labeled "dump solenoid) via control line(s) 213 and 215, respectively, thereby opening the fluid supplying path between the fuel pump 204 and the ignitor plug 100 and causing fuel to flow along the path shown by the highlighted arrow 217. The electronic control circuit 210 also supplies a DC voltage (e.g., 12V DC) across the two terminal connectors 136A, 136B of the ignitor plug 100, thereby activating the resistive heating provided by the conductive wire loop 106 and ceramic body 104 of the ignitor plug 100 such that the fuel flowing through the ignitor plug 100 is vaporized and ignited as described above. The flame 218 from the burning vaporized fuel ignites liquid fuel that is injected into the combustion chamber 129 via the second fluid supply path 205B and nozzles 206, thereby allowing for combustion start-up.

After combustion start-up is complete (which is typically identified by sensing that the temperature of the exhaust gas has risen to a predetermined level), the electronic control circuit 210 transitions to the normal ON mode of operation as shown in FIG. 5. In the normal ON mode, the electronic control circuit 210 activates the fuel pump 202 via control line(s) 211 while closing the start solenoid 208A via control line(s) 213 to thereby block the supply of fuel along the fuel supply path 205A. The electronic control circuit 210 also supplies a minimal DC voltage (e.g., 0 V DC) across the two terminal connectors 136A, 136B of the ignitor plug 100, thereby de-activating the resistive heating provided by the conductive wire loop 106 and the ceramic body 104 of the ignitor plug 100. Finally, the electronic control circuit 210 controls the dump solenoid 208B via line(s) 215 to fluidly couple the fluid supply path leading to the internal fluid path of the ignitor plug 100 to a dump fuel line 219, thereby venting the internal fluid path of the ignitor plug 100 such that any liquid fuel that remains or enters therein during the normal ON mode will be exhausted out the dump fuel line 219 as depicted by arrow 221.

Advantageously, such venting/fuel dump operations significantly reduce the susceptibility of fuel coking the fuel path through the ignitor plug 100, and thus improve the operational lifetime of the ignitor plug 100.

There have been described and illustrated herein several embodiments of an ignitor plug for heating and igniting combustible fuel that flows therethrough. While particular embodiments of the invention have been described, it is not intended that the invention be limited thereto, as it is intended that the invention be as broad in scope as the art will allow and that the specification be read likewise. Thus, while a particular shape and configuration of an ignitor plug has been disclosed, it will be appreciated that other shapes and configurations can be used as well. For example, the ceramic tubular body disclosed above is in direct contact with fuel passing therethrough. In an alternative embodiment, a tubular insert (such as a metal tube) can extend within a passageway through the ceramic tubular body and act as a conduit for the passage of fuel through the assembly. In this configuration, the ceramic body heats the fuel through indirect heating of the tubular insert. In another example, the ignitor plug disclosed above includes a coiled section that provides resistive heating of the ceramic tubular body in series with an ignitor coil section disposed downstream therefrom. Alternatively, these two coiled sections can be configured as part of separate conductive loops that are wired in a parallel arrangement to an electrical power supply source. In yet other alternative embodiments, more that one coiled section can be used to provide resistive heating of the ceramic body. Such coil sections can be wired in a series arrangement or a parallel arrangement to an electrical power supply source. In addition, while particular materials and particular combustible fuels have been disclosed, it will be understood that other suitable materials and combustible fuels can be used as well. Also, while it is preferred that a DC voltage source be used to drive the conductive wire loop(s) of the ignitor plug, it will be recognized that other suitable electrical power sources such as AC voltage source can be used as well. In addition, while particular wire resistance values, DC voltage source values, wattage ranges and heating temperature ranges are described, other wire resistance values, DC voltage source values, wattage ranges and heating temperature ranges can be used. Furthermore, while a particular smart fuel supply system is disclosed, it will be understood that the ignitor plugs described herein can be similarly used in a wide variety of combustion applications. It will therefore be appreciated by those skilled in the art that yet other modifications could be made to the provided invention without deviating from its spirit and scope as claimed.

What is claimed is:

1. An apparatus for igniting fluid fuel in a combustion chamber, the apparatus comprising:
    a casing that supports a conductive wire loop and a ceramic body, said ceramic body having a fuel path therethrough, said conductive wire loop for resistive heating of said ceramic body in order to heat fluid fuel flowing through said fuel path, wherein said conductive wire loop has a first lengthwise dimension and said ceramic body extends along a substantial portion of said first lengthwise dimension of said conductive wire loop, and said conductive wire loop includes a helical coiled section that is disposed downstream from said ceramic body in contact with fluid fuel that exits from said fuel path through said ceramic body for igniting such fluid fuel.

2. An apparatus according to claim 1, wherein:
    said conductive wire loop has a helical coiled section that surrounds said ceramic body, said helical coiled section has a second lengthwise dimension, and said ceramic body extends along a substantial portion of said second lengthwise dimension of said helical coiled section.

3. An apparatus according to claim 1, wherein:
    said casing comprises multiple parts that are detachably connected to one another to form an interior chamber that supports said conductive wire loop and said ceramic body therein.

4. An apparatus according to claim 1, further comprising:
    a pair of connectors that are electrically coupled to corresponding terminals of said conductive wire loop.

5. An apparatus according to claim 1, wherein:
    said ceramic body includes an internal passageway through which a portion of said conductive wire loop extends.

6. An apparatus according to claim 5, wherein:
said internal passageway extends through a portion of said ceramic body that is surrounded by a helical coiled section of said conductive wire loop.

7. An apparatus according to claim 1, wherein:
said conductive wire loop is realized from nichrome wire.

8. An apparatus according to claim 1, wherein:
said conductive wire loop has a resistance in a range between 4.9 and 5.1 ohms in its desired operating temperature range.

9. An apparatus according to claim 1, further comprising:
an electrical power source operably coupled to said conductive wire loop, said electrical power source supplying less than 30W of electrical power to said conductive wire loop for resistive heating of said ceramic body in order to heat fluid fuel flowing through said fuel path.

10. An apparatus according to claim 1, wherein:
said ceramic body is in direct contact with fluid fuel flowing through said fuel path.

11. An apparatus according to claim 1, wherein:
said casing is sized and shaped such that it is directly interchangeable with existing glow plugs for small-size turbine engines.

12. An apparatus for igniting fluid fuel in a combustion chamber, the apparatus comprising:
a casing that supports a conductive wire loop and a ceramic body, said ceramic body defining a fuel path such that said ceramic body is in direct contact with fluid fuel flowing through said fuel path, said conductive wire loop including a first helical coiled section and a second helical coiled section, said first helical coiled section surrounding said ceramic body for resistive heating of said ceramic body in order to heat fluid fuel flowing through said fuel path, and said second helical coiled section disposed downstream from said ceramic body in contact with fluid fuel that exits from said fuel path through said ceramic body for igniting such fluid fuel.

13. An apparatus according to claim 12, wherein:
said conductive wire loop has a first lengthwise dimension and said ceramic body extends along a substantial portion of said first lengthwise dimension of said conductive wire loop.

14. An apparatus according to claim 13, wherein:
said first helical coiled section has a second lengthwise dimension, and said ceramic body extends along a substantial portion of said second lengthwise dimension of said helical coiled section.

15. An apparatus according to claim 12, wherein:
said casing is sized and shaped such that it is directly interchangeable with existing glow plugs for small-size turbine engines.

16. An apparatus for igniting fluid fuel in a combustion chamber, the apparatus comprising:
a casing that supports a conductive wire loop and a ceramic body, said ceramic body defining a fuel path therethrough, said conductive wire loop for resistive heating of said ceramic body, said conductive wire loop including a first helical coiled section and a second helical coiled section, said first helical coiled section surrounding said ceramic body for resistive heating of said ceramic body, and said second helical coiled section disposed downstream from said ceramic body in contact with fluid fuel that exits from said fuel path through said ceramic body for igniting such fluid fuel; and
means for applying electrical power to said conductive wire loop such the resistive heating of said ceramic body causes vaporization of liquid-phase fluid fuel passing through said fuel path of said ceramic body.

17. An apparatus according to claim 16, wherein:
said conductive wire loop provides resistive heating at a temperature greater than 1300° F.

18. An apparatus according to claim 16, wherein:
said means for supplying electrical power comprises a DC voltage source that supplied a predetermined DC voltage signal.

19. An apparatus according to claim 16, wherein:
said means for supplying electrical power supplies less than 30W of electrical power to said conductive wire loop for resistive heating of said ceramic body.

20. An apparatus according to claim 16, wherein:
said ceramic body is in direct contact with fluid fuel flowing through said fuel path.

21. An apparatus according to claim 20, wherein:
said conductive wire loop has a first lengthwise dimension and said ceramic body extends along a substantial portion of said first lengthwise dimension of said conductive wire loop.

22. An apparatus according to claim 21, wherein:
said conductive wire loop has a helical coiled section that surrounds said ceramic body, said helical coiled section has a second lengthwise dimension, and said ceramic body extends along a substantial portion of said second lengthwise dimension of said helical coiled section.

23. An apparatus according to claim 16, wherein:
said conductive wire loop has a resistance in a range between 4.9 and 5.1 ohms in its desired operating temperature range.

* * * * *